US006612195B2

(12) United States Patent
Gmirya et al.

(10) Patent No.: US 6,612,195 B2
(45) Date of Patent: Sep. 2, 2003

(54) SPLIT-TORQUE FACE GEAR TRANSMISSION

(75) Inventors: Yuriy Z. Gmirya, Rego Park, NY (US); Jules G. Kish, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 95 days.

(21) Appl. No.: 09/995,269

(22) Filed: Nov. 26, 2001

(65) Prior Publication Data

US 2003/0097893 A1 May 29, 2003

(51) Int. Cl.[7] .................................................. F16H 1/20
(52) U.S. Cl. ........................ 74/416; 74/392; 74/665 C; 74/664; 244/60; 244/17.19
(58) Field of Search .......................... 74/416, 392, 395, 74/410, 661, 664, 665 R, 665 A, 665 B, 665 C; 244/17.19, 17.21, 17.11, 60; 416/170 R; 475/230, 246, 346

(56) References Cited

U.S. PATENT DOCUMENTS

| 4,297,907 A | 11/1981 | Bossler, Jr. et al. |
| 5,233,886 A | 8/1993 | Bossler, Jr. |
| 5,247,856 A | 9/1993 | Cuypers |
| 5,509,862 A | 4/1996 | Sherman |
| 5,802,918 A | 9/1998 | Chen et al. |
| 5,823,470 A | 10/1998 | Craig et al. |
| 5,941,124 A * | 8/1999 | Tan ............................ 74/409 |
| 6,041,670 A | 3/2000 | Basstein |
| 6,183,388 B1 | 2/2001 | Hawkins |
| 6,244,175 B1 | 6/2001 | Lin et al. |
| 6,260,430 B1 | 7/2001 | Andrei |
| 6,276,633 B1 | 8/2001 | Balayn et al. |

OTHER PUBLICATIONS

Grinding of Cylkro face gears. New perspectives for the automotive and helicopter industry, webpage, Oct. 2, 2001, http://www.powertransmission.com/copage/crown.htm.
Basstein, Guss. Caculation, Manufacturing and Applications of Cylkro Angular Face Gear Transmissions, article; (figure 23); Jan. 26–27, 2000, The Netherlands.

* cited by examiner

Primary Examiner—Pam Rodriguez
(74) Attorney, Agent, or Firm—Carlson, Gaskey & Olds

(57) ABSTRACT

A face gear transmission system divides the input torque into multiple kinematic paths. The first kinematic scheme consists of a drive shaft and driven shaft having a plurality of pinions which contact a primary face gear. The second kinematic scheme consists of two independent symmetrical gear paths. One is a first pinion, a first idler and a first idler face gear and the primary face gear. The other independent gear path is a pinion on the second shaft, the idler, and second idler face gear and the primary face gear. The face gear transmission is especially applicable to rotorcraft having one or more input drive shafts to provide a proprotor transmission system which is relatively small in size and light in weight.

8 Claims, 1 Drawing Sheet

SPLIT-TORQUE FACE GEAR TRANSMISSION

BACKGROUND OF THE INVENTION

The present invention relates to a split torque gear box, and more particularly to an aircraft face gear transmission system.

A transmission system of a rotorcraft or propeller-driven aircraft transfers power from a turbine engine to the rotor or propeller of the rotorcraft or aircraft. A typical proprotor transmission system may direct power from several turbine engines to a single rotor or propeller. Since the rotational velocity of the rotor or propeller is significantly lower than the rotational velocity of the turbine engines, the turbine engine rotational velocity must be reduced by the transmission system. In reducing the rotational velocity of the turbine engine output, torque is increased by the proprotor transmission system through a series of intermediate gear stages and shafts, before the final output drive is provided to the rotor. Relatively large gears are required near the final output drive of the proprotor transmission system to handle the high torque supplied to the rotors.

Many conventional transmission systems include a number of gears arranged for providing split-torque paths. However, conventional split torque transmission systems are somewhat heavy and voluminous. Typically, this is due to the final gears which, although effective, are relatively large and heavy. Additionally, relatively large bearings are required to support the forces generated between the input shafts and face gear which further increases the system weight.

Accordingly, it is desirable to provide a proprotor transmission system, which is relatively small in size and weight, and which minimizes the size of supporting bearings.

SUMMARY OF THE INVENTION

The face gear transmission system according to the present invention provides a face gear mounted to an output shaft such as a proprotor shaft which defines a shaft axis of rotation. A first idler face gear and a second idler face gear are coaxially mounted about the shaft axis A. The first and second idler face gears rotate freely relative to the output shaft.

A first input shaft is connected to and driven by a gas turbine engine. The first input shaft drives a second shaft such that the first and second shaft drive the face gear and the first and second idler face gears. A first and second idler serve as crossover gears transferring power from the idler face gears to the face gear.

The present invention divides the input torque from the gas turbine engine into multiple kinematic paths. The first kinematic scheme consists of a drive shaft and driven shaft having a plurality of pinions which contact a primary face gear. The second kinematic scheme consists of two independent symmetrical gear paths. One is a first pinion, a first idler and a first idler face gear and the primary face gear. The other independent gear path is a pinion on the second shaft, the idler, and second idler face gear and the primary face gear. That is, the primary face gear is the only output gear that combines power from all pinions and idlers.

The present invention is especially applicable to rotorcraft having one or more input drive shafts to provide a proprotor transmission system which is relatively small in size and light in weight.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
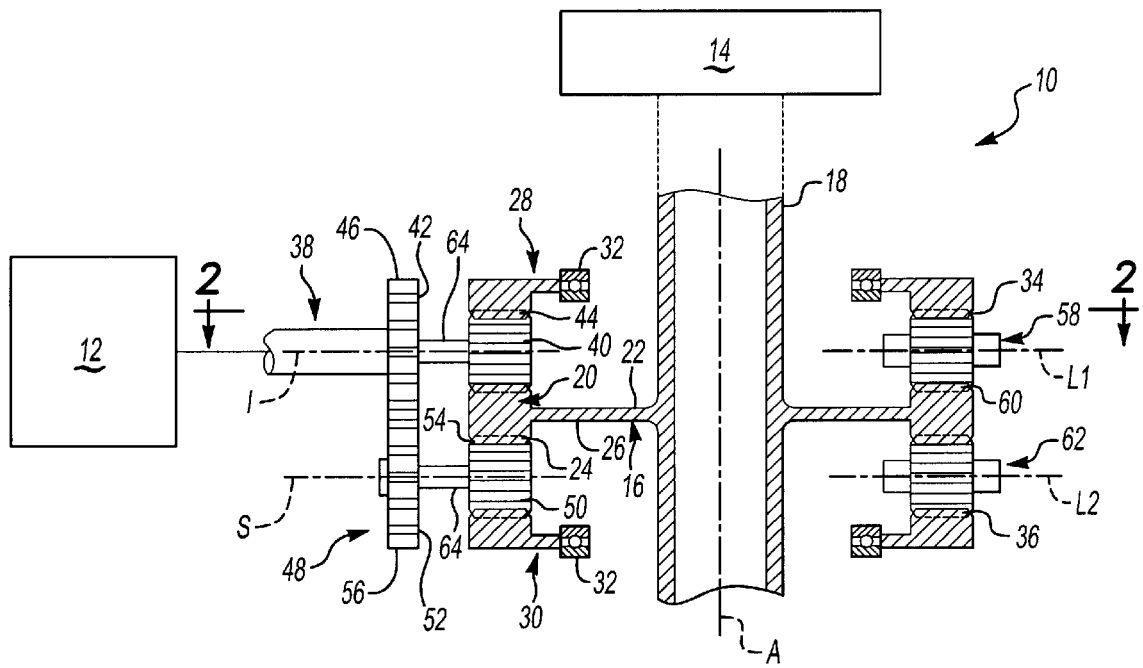
FIG. 1 is a sectional side view of a transmission system of the present invention.

FIG. 1 illustrates a general perspective view of a face gear transmission system 10. In the case of a helicopter transmission, the face gear transmission system 10 is interposed between one or more gas turbine engines (illustrated schematically at 12) and a rotor assembly (illustrated schematically at 14).

A primary face gear 16 is mounted to an output shaft 18 such as a rotor shaft which defines a shaft axis of rotation A. Driving the primary face gear 16 rotates the output shaft 18 about axis A to drive the rotor assembly 14. The face gear 16 includes a first set of gear teeth 20 extending from a first surface 22 about a perimeter of the face gear 16. A second set of gear teeth 24 extend from a second surface 26 about a perimeter of the face gear 16 . The first surface 22 is directly opposed from the second surface 26 such that each side of the substantially disk shaped primary face gear 16 includes an identical set of gear teeth.

A first idler face gear 28 and a second idler face gear 30 are coaxially mounted about the shaft axis A. Preferably, the first and second idler face gear 28, 30 are of a substantially same diameter as the primary face gear 16. The first and second idler face gear 28, 30 are mounted axially along the output shaft 18 relative to each surface 22, 26 of the face gear 16. The first and second idler face gear 28, 30 are each mounted upon a bearing assembly (illustrated schematically at 32) or the like to provide free rotation of the first and second idler face gear 28, 30 relative to the output shaft 18.

The first idler face gear 28 includes a third set of gear teeth 34 facing the first set of gear teeth 20. The second idler face gear 30 includes a fourth set of gear teeth 36 facing the second set of gear teeth 24.

A first input shaft 38 is connected to and driven by the gas turbine engine 12. The first input shaft 38 defines a first input axis of rotation I. The first input axis of rotation I is generally perpendicular to the shaft axis of rotation A. A first pinion 40 and a second pinion 42 are mounted to the first input shaft 38. Each of the first and second pinions 40, 42 have radial teeth 44, 46 on its outer radial periphery with edges parallel to the axis of rotation 1. The radial teeth 44 of the first pinion 40 are in contact with both the first set of gear teeth 20 and the third set of gear teeth 34.

A second shaft 48 defines a second axis of rotation S which is substantially parallel to the first input axis of rotation I. The second axis of rotation S is located within a plane formed by axis A and axis I. A third pinion 50 and a fourth pinion 52 are mounted to the second shaft 48. Each of the third and fourth pinions 50, 52 have radial teeth 54, 56 on its outer radial periphery with edges parallel to the second axis of rotation S. The radial teeth 54 of the third pinion 50 are in contact with both the second set of gear teeth 24 and the fourth set of gear teeth 36.

Figure 2:
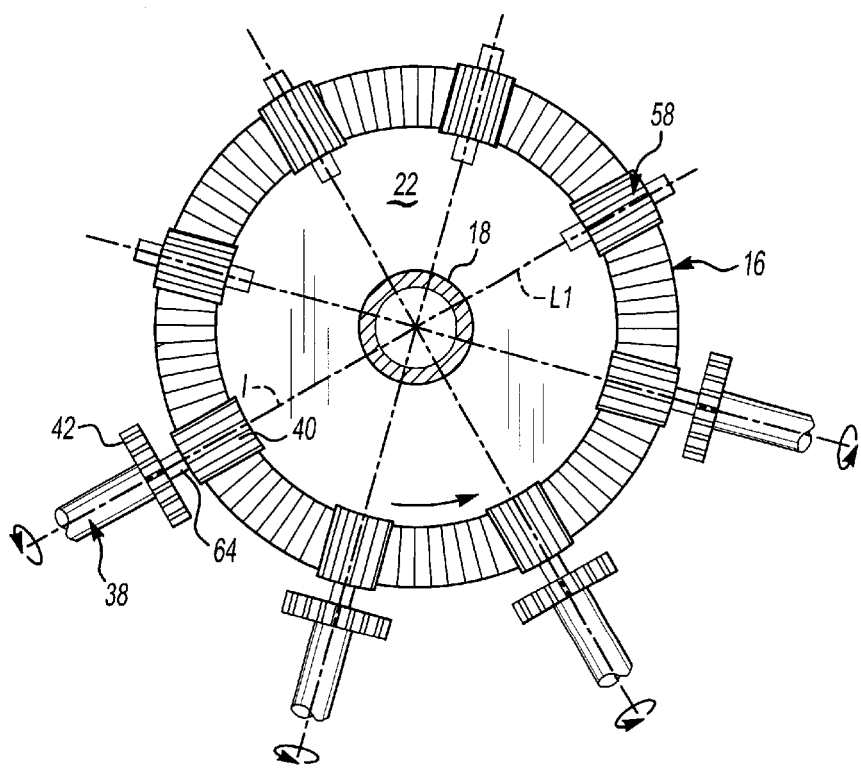
FIG. 2 is a cross-sectional view taken along line 2—2 of FIG. 1.

A first idler 58 defines a first idler axis of rotation L1. It should be understood that the first idler 58 is preferably independently supported by bearings (not shown) or the like. The first idler axis of rotation L1 is preferably defined along the first input axis of rotation I. That is, the first idler 58 is 180 degrees away from the first input shaft 38 (FIG. 2). The first idler 58 has radial teeth 60 on its outer radial periphery with edges parallel to the axis of rotation L1. The radial teeth 60 of the first idler 58 are in contact with both the first set of gear teeth 20 and the third set of gear teeth 34.

A second idler 62 defines a second idler axis of rotation L2. It should be understood that the second idler 62 is preferably independently supported by bearings (not shown) or the like. The second idler axis of rotation L2 is preferably defined along the second axis of rotation S. That is, the second idler 62 is 180 degrees away from the second shaft 48. The second idler 62 has radial teeth 60 on its outer radial periphery with edges parallel to the axis of rotation L2. The radial teeth 60 of the second idler 62 are in contact with both the second set of gear teeth 24 and the fourth set of gear teeth 36.

The fourth pinion 52 is in contact with the second pinion 42 and is driven thereby. The second shaft 48 is thereby driven by the first input shaft 38 through the meshing of the radial teeth 46, 56 of the fourth pinion 52 and second pinion 42. The first input shaft 38 thus simultaneously drives the second shaft 48, the face gear 16, the first idler face gear 28 and the second idler face gear 30.

The first and second idler 58, 62 eliminate axial load on the primary face gear 16 as the radial loads from pinions 40, 50 are equal and pointed in opposite direction. The first idler 58 and the second idler 62 serve as crossover gears transferring power from the idler face gears 28, 30 to the primary face gear 16. The first idler face gear 28 and the second idler face gear 30 transmit torque from the first pinion 40 and the third pinion 50 to the first idler 58 and the second idler 62 such that the input torque from the first input shaft 38 is shared therebetween. The first and second idler 58, 62 are preferably mounted such that they may float both axially and radially so as to provide automatic and flexible balancing between the face gear and idler face gear with which each is engaged. Many arrangements are known which ensure that the pinion gear is free-floating.

The present invention divides the input torque from the gas turbine engine into multiple kinematic paths. Each kinematic path requires a smaller individual gear member which leads to a lighter design, a more compact package, and smaller gear face width due to the lower loads in each gear mesh. The smaller but more numerous gears also require smaller bearings which have an exponentially increased life span due to less applied torque. The first kinematic scheme consists of the pinions 40, 42, 50, 52 and primary face gear 16. The second kinematic scheme consists of two independent symmetrical gear paths. One is the first pinion 40, idler 58 and the first idler face gear 28 and the primary face gear 16. The other independent gear path is pinion 50, idler 62, second idler face gear 30 and the primary face gear 16. The primary face gear 16 is the only output gear that combines power from all pinions and idlers. It should be understood that the idlers may additionally serve as power extraction paths for providing power to auxiliary devices.

A flexible coupling 64 is located between the first and second pinions 40, 42 and the third and fourth pinions 50, 52. The flexible coupling 64 is preferably a torsionally soft quill shaft. The quill shaft allows half of the input torque by means of the pinions 42, 52 mesh to go to the quill shaft of the second shaft 48 and to the third pinion 50, so the first pinion 40 and the third pinion 50 receive the same torque. Preferably, based upon manufacturing tolerances, operational and temperature deflections, the stiffness of the quill shafts should be selected so that the accumulative error would be within 2–4% of the total quill shaft wind angle under full operational torque. It should be understood that the load maybe additionally or alternatively be shared by helical gearings, axial spring alignment, torque links, or the like which will also benefit from the present invention.

The present invention is especially applicable to rotorcraft having one or more input drive shafts (FIG. 2). The present invention can accommodate a range of input drive shaft angles and speeds. Weight and performance benefits may be maximized when more than one input shaft is involved, for example, or when high power capacity and large speed reduction is desired.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A face gear transmission comprising:
   an output shaft defining a shaft axis;
   a first face gear coaxially mounted to said output shaft, said face gear having a first set of gear teeth extending from a first surface and a second set of gear teeth extending from a second surface, said first surface opposed from said second surface;
   a first idler face gear coaxially mounted about said shaft axis, said first idler face gear having a third set of gear teeth facing said first set of gear teeth;
   a second idler face gear coaxially mounted about said shaft axis, said second idler face gear having a fourth set of gear teeth facing said second set of gear teeth;
   a first input shaft defining a first input axis;
   a first pinion and a second pinion mounted to said input shaft, said first pinion in contact with both said first set of gear teeth and said third set of gear teeth;
   a second shaft defining a second axis;
   a third pinion and a fourth pinion mounted to said second shaft, said third pinion in contact with both said second set of gear teeth and said fourth set of gear teeth, said fourth pinion in contact with said second pinion;
   a first idler defining a first idler axis, said first idler in contact with both said first set of gear teeth and said third set of gear teeth; and
   a second idler defining a second idler axis, said second idler in contact with both said second set of gear teeth and said fourth set of gear teeth.

2. The face gear transmission as recited in claim 1, further comprising a turbine engine for driving said first input shaft.

3. The face gear transmission as recited in claim 1, wherein said first input axis is defined along said first idler axis.

4. The face gear transmission as recited in claim 1, wherein said second axis is defined along said second idler axis.

5. The face gear transmission as recited in claim 1, further comprising a first flexible coupling in said input shaft, said flexible coupling located between said first pinion and said second pinion and a second flexible coupling in said second shaft, said flexible coupling located between said third pinion and said fourth pinion.

6. The face gear transmission as recited in claim 5, wherein said first and second flexible coupling include a quill shaft.

7. The face gear transmission as recited in claim 1, wherein said first input axis, first idler axis, said second axis, and said second idler axis are perpendicular to said shaft axis.

8. A helicopter transmission comprising:

an output shaft defining a shaft axis;

a first face gear coaxially mounted to said output shaft, said face gear having a first set of gear teeth extending from a first surface and a second set of gear teeth extending from a second surface, said first surface opposed from said second surface;

a first idler face gear coaxially mounted about said shaft axis, said first idler face gear having a third set of gear teeth facing said first set of gear teeth;

a second idler face gear coaxially mounted about said shaft axis, said second idler face gear having a fourth set of gear teeth facing said second set of gear teeth;

a first input shaft defining a first input axis;

a first pinion and a second pinion mounted to said input shaft, said first pinion in contact with both said first set of gear teeth and said third set of gear teeth;

a second shaft defining a second axis;

a third pinion and a fourth pinion mounted to said second shaft, said third pinion in contact with both said second set of gear teeth and said fourth set of gear teeth, said fourth pinion in contact with said second pinion;

a first idler defining a first idler axis, said first idler in contact with both said first set of gear teeth and said third set of gear teeth; and a second idler defining a second idler axis, said second idler in contact with both said second set of gear teeth and said fourth set of gear teeth.

* * * * *